United States Patent [19]

Kretchmar et al.

[11] Patent Number: 4,664,068
[45] Date of Patent: May 12, 1987

[54] HEAT GENERATING UNIT FOR HEATING A LIQUID

[75] Inventors: Monte R. Kretchmar, Medford; Charles K. England, Enid, both of Okla.

[73] Assignee: Behm, Inc., Enid, Okla.

[21] Appl. No.: 917,531

[22] Filed: Oct. 10, 1986

[51] Int. Cl.$^4$ .............................. F22B 3/06
[52] U.S. Cl. ..................... 122/26; 126/247; 210/787; 210/912; 237/1 R
[58] Field of Search .............. 122/11, 12, 26, 27, 122/28; 237/1 R; 126/247; 165/86; 415/90, 208; 210/787, 912

[56] References Cited

U.S. PATENT DOCUMENTS

| | | | |
|---|---|---|---|
| 1,650,612 | 4/1926 | Dennison. | |
| 1,973,607 | 9/1934 | Bunn, Jr. | 210/787 |
| 2,344,075 | 3/1944 | Beldimano | 122/26 |
| 3,245,399 | 4/1966 | Lawson | 126/247 |
| 3,260,039 | 7/1966 | Brown et al. | 415/90 |
| 3,273,631 | 9/1966 | Neuman | 122/26 X |
| 4,004,553 | 1/1977 | Stenstrom | 122/26 |
| 4,273,075 | 6/1981 | Freihage | 122/26 |
| 4,325,354 | 4/1982 | Fuchs | 126/247 |
| 4,357,931 | 11/1982 | Wolpert et al. | 126/247 |
| 4,388,915 | 6/1983 | Shafran | 126/247 |
| 4,419,980 | 12/1983 | Leary et al. | 126/247 |
| 4,454,861 | 6/1984 | Grenier | 126/247 |
| 4,480,592 | 11/1984 | Gokcen | 122/26 |
| 4,524,755 | 6/1985 | Harris et al. | 126/247 |

Primary Examiner—Albert J. Makay
Assistant Examiner—Steven E. Warner
Attorney, Agent, or Firm—Dunlap, Codding & Peterson

[57] ABSTRACT

A heat generating unit for heating a liquid comprising a housing, at least one wedge, generally circularly shaped rotor, and means for rotating the rotor. The housing has a rotor cavity formed in a portion thereof with an inlet opening being formed through a portion of the housing intersecting the rotor cavity, and an outlet opening being formed in the housing intersecting the rotor cavity. Each wedge member is generally triangularly shaped in one cross section and includes a wedge base and a forward wedge wall. The rotor has an outer peripheral surface and is rotatingly disposed in the rotor cavity. The rotor has a forward face and a rearward face. Each wedge member is disposed generally between the forward face of the rotor in the forward end wall in the housing and each wedge member is positioned on the forward end wall so the wedge forward wall generally faces one direction of rotation of the rotor, the outlet in the housing is disposed generally near a central portion of the rotor. A minimum of six holes are formed through the rotor with the holes being spaced a distance from the center of the rotor and spaced circumferentially about the rotor. The rotor is rotated in a direction of rotation generally toward the wedge forward end wall of each of the wedge members.

14 Claims, 5 Drawing Figures

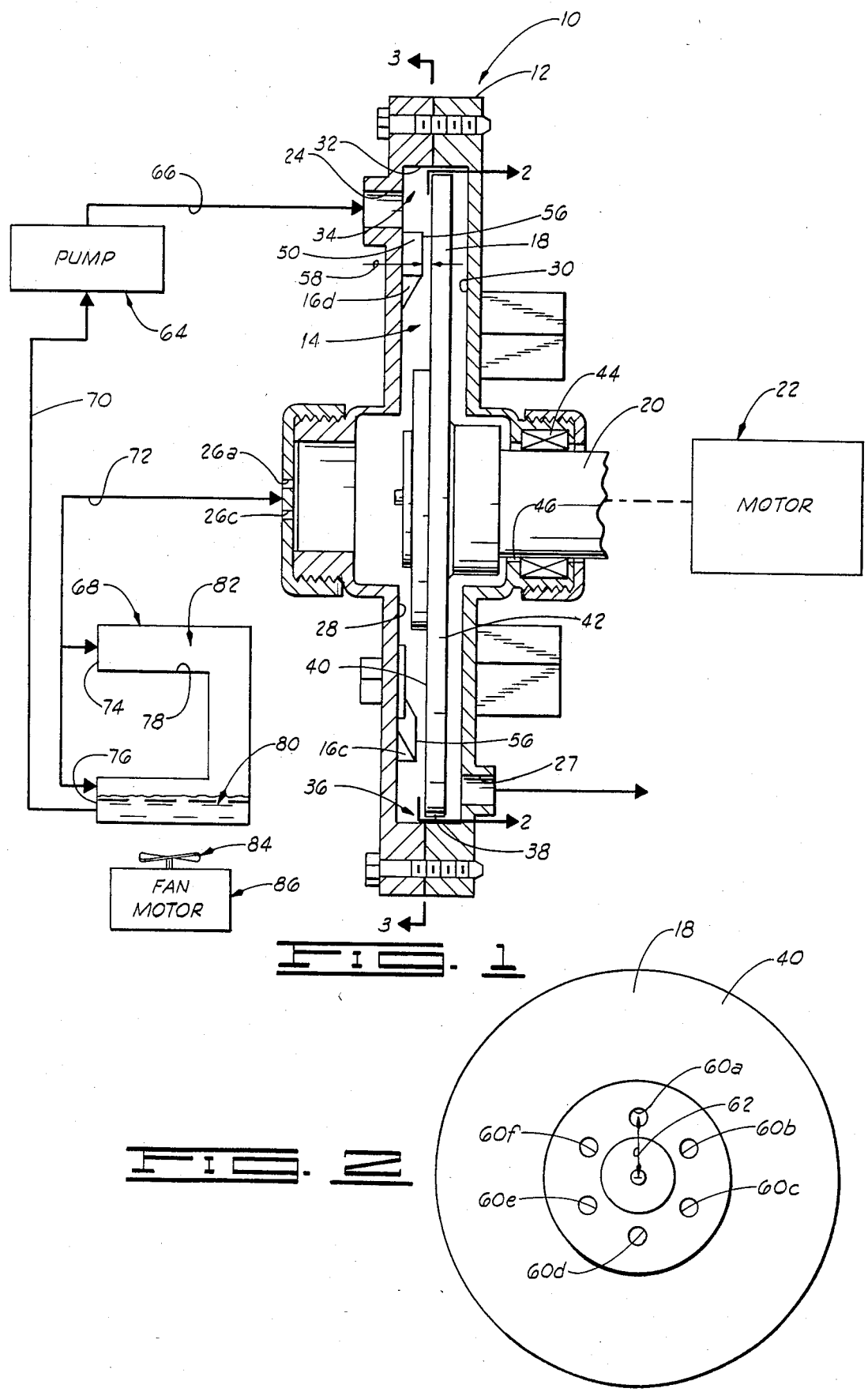

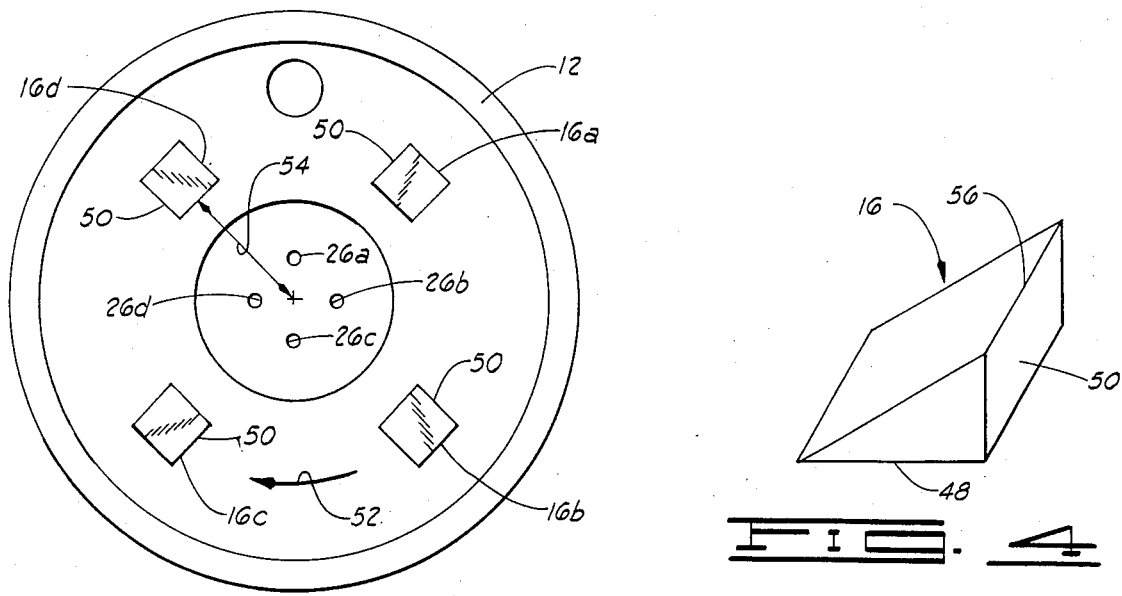
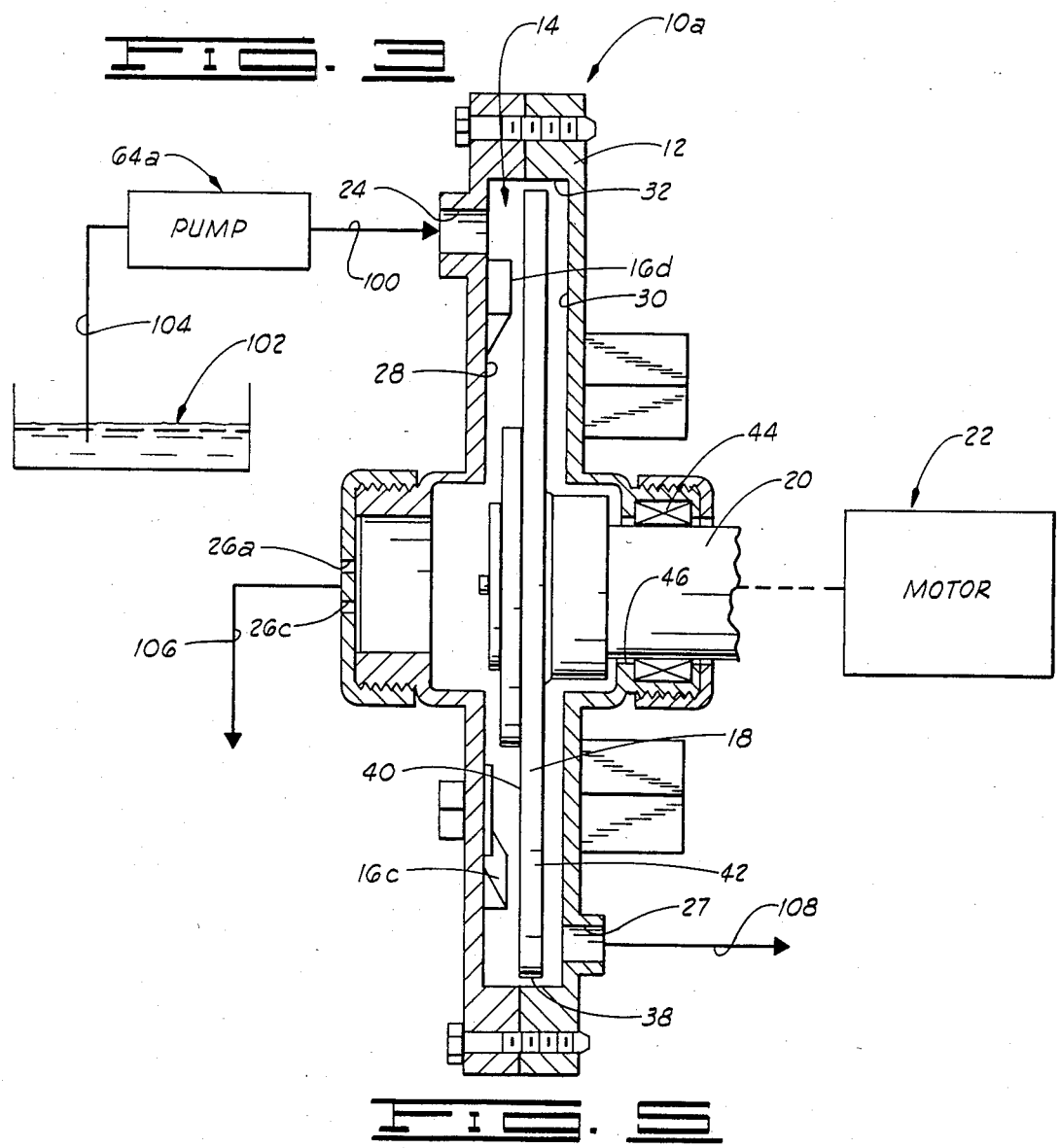

HEAT GENERATING UNIT FOR HEATING A LIQUID

FIELD OF THE INVENTION

The present invention relates generally to means for heating a liquid and, more particularly, but not by way of limitation, to a heat generating unit wherein liquid is passed between a wedge and a rotating rotor to heat the liquid, heated liquid and or steam being passed from the heat generating unit. In another aspect, the present invention also contemplates a heat generating unit for removing heavy metals from the liquid feed mixture.

BRIEF DESCRIPTION OF THE DRAWINGS

FIG. 1 is a sectional view of a heat generating unit constructed in accordance with the present invention, the heat generating unit being shown in FIG. 1 connected to a motor for rotating the rotor, a pump and a coil assembly.

FIG. 2 is a front plan view of the rotor portion of the heat generating unit of FIG. 1, taken substantially along the line 2—2 of FIG. 1.

FIG. 3 is a sectional view of the heat generating unit of FIG. 1 taken substantially along the line 3—3 of FIG. 1.

FIG. 4 is a diagrammatic, partial isometric view of a typical wedge used in the heat generator shown in FIG. 1.

FIG. 5 is a sectional view of the heat generating unit of FIG. 1, but showing the heat generating unit in an application for remaining heavy metals from a liquid feed mixture.

DESCRIPTION OF THE PREFERRED EMBODIMENTS

Referring to the drawings in general and to FIG. 1 in particular, shown therein and designated by the general reference numeral 10 is a heat generating unit which is constructed in accordance with the present invention. The heat generating unit 10 generally includes a housing 12 having a rotor cavity 14 formed in a portion thereof, at least one wedge member 16 (four wedge members 16 being shown in the embodiment of the heat generating unit shown in FIGS. 1 and 3 with the individual wedge members being designating in FIGS. 1 and 3 by the specfic reference numerals 16a, 16b, 16c and 16d), the wedge members 16 being connected to the housing 12 and disposed generally in the rotor cavity 14, a generally circularly shaped rotor 18 is rotatingly disposed in the rotor cavity 14 and a central portion of the rotor 18 is connected to one end of a shaft 20, the opposite end of the shaft 20 being connected to a motor 22. An inlet opening 24 is formed through a portion of the housing 12 and the inlet opening 24 intersects the rotor cavity 14 thereby establishing fluidic communication between the inlet opening 24 and the rotor cavity 14, the inlet opening 24 being disposed generally near the outer peripheral surface of the rotor 18. An outlet opening 26 is formed through a central portion of the housing 12 and the outlet opening 26 also intersects the rotor cavity 14, thereby establishing fluidic communication between the outlet opening 26 and the rotor cavity 14 (four outlet openings more particularly being shown in FIGS. 1 and 3 and designated therein by the specfic reference numerals 26a, 26b, 26c and 26d). As shown in FIG. 1, the housing 12 also includes a discharge opening 27 which is formed through a lower end portion of the housing 12 intersecting the rotor cavity 14. Thus, the discharge opening 27 is also in fluidic communication with the rotor cavity 14. In the application shown in FIG. 1, the discharge opening 27 is closed and not utilized. However, the discharge opening 27 can be utilized in some applications as will be described in greater detail below with respect to FIG. 5.

In general, water under pressure is passed into the inlet opening 24 and the water passes into the rotor cavity 14 generally adjacent the outer peripheral surface of the rotor 18, the rotor 18 being rotated within the rotor cavity 14 by the motor 22 which is connected to the rotor 18 by way of the shaft 20. The water in the rotor cavity 14 passes or is moved generally toward a central portion of the rotor 18 and, as the water is moved toward the central portion of the rotor 18, the water passes between the wedge members 16 and the forward face of the rotor 18 causing the water to shear resulting in a friction which heats the water or, in some applications, converts the water into super heater steam, the heated water or super heated steam passing out of the rotor cavity 14 through the outlet openings 26.

As shown more clearly in FIG. 1, the rotor cavity 14 formed in the housing 12 forms a forward end wall 28, a rearward end wall 30 and a generally circularly shaped peripheral wall 32. The peripheral wall 32 has an upper end portion 34 and a lower end portion 36. The rotor cavity 14 is generally cylindrically shaped and has a diameter slightly larger than the diameter of the rotor 18 so the rotor 18 can be rotatingly supported within rotor cavity 14 with a minimum clearance between the outer peripheral surface of the rotor 18 and the peripheral wall 32 formed in the housing 12. The rotor cavity 14 also is sized and shaped so that a predetermined minimum clearance exist between each of the wedge members 16 and the rotor 18 and so that a minimum clearance is provided between the rotor 18 and the rearward end wall 30 formed in the housing 12 rotor cavity 14.

The rotor 18 is generally circularly shaped and has an outer peripheral surface 38, a forward face 40 and a rearward face 42. The rotor 18 is disposed within the rotor cavity 14 so that the forward face 40 of the rotor 18 generally faces the forward end wall 28 formed in the housing 12 by the rotor cavity 14, and the rearward face 42 of the rotor 18 generally faces the rearward end wall 30 formed in the housing 12 by the rotor cavity 14. The outer peripheral surface 28 of the rotor 18 is disposed generally near and spaced a distance from the peripheral wall 32 formed in the housing 12 by the rotor cavity 14. Thus, the rearward face 42 of the rotor 18 is spaced a predetermined distance from the rearward end wall 30 formed in the housing 12 by the rotor cavity 14.

One end of the shaft 20, more particularly, is connected to a central portion to a rearward face 42 of the rotor 18 and the shaft 20 is bearingly supported in the housing 12 by bearings 44, the shaft 20 extending through an opening 46 formed through a central portion of the housing 12 and one end of the shaft 20 extends a distance into the rotor cavity 14, this end of the shaft 20 being connected to a central portion of the rotor 18. The opposite end of the shaft 20 is connected to the motor 22 so that the motor 22 rotatingly drives the shaft 20 and the rotor 18 connected thereto during the operation of the heat generating unit 10.

As shown more clearly in FIG. 4, each wedge member 16 is generally triangularly shaped in one cross section thereby forming a wedge base 48 and a forward wedge wall 50. The wedge base 48 of each of the wedges 16 is secured to the forward end wall 28 formed in the housing 12 by the rotor cavity 14 and each of the wedges 16 is positioned so that the forward wedge wall 50 of each of the wedges 16 generally faces the direction of rotation of the rotor 18, as indicated in FIG. 3 wherein the wedges 16 are positioned so that the forward wedge wall 50 of each of the wedges 16 generally faces a direction of rotation 52 of the rotor 18. As mentioned before, the heat generating unit 10, preferably, includes four wedge members 16a, 16b, 16c and 16d and each of the wedge members 16 is positioned on the forward end wall 28 formed in the housing 12 by the rotor cavity 14 so that each of the wedges 16 is spaced a distance 54 radially from a central portion of the rotor 18 and so that each of the wedge members 16 is disposed in the rotor cavity 14 generally near and spaced a distance radially inwardly from the outer peripheral surface 38 of the rotor 18. Each of the wedge members 16 is positioned on the forward end wall 28 formed in the housing 12 by the rotor cavity 14 and spaced at equal distance positions circumferentially about the forward end wall 28 so that each of the wedge members 16 is spaced at equal distance positions circumferentially about the forward face 40 of the rotor 18. The upper end 56 (shown in FIG. 4) of each wedge member 16 being spaced a distance 58 (shown in FIG. 1 with respect to the wedge member 16d) from the forward face 40 of the rotor 18.

As shown more clearly in FIG. 2, a rotor opening 60 is formed through the rotor 18. More particularly and in one preferred embodiment as shown in the drawings, six rotor openings are formed through the rotor 18 with the four rotor openings being designated by the specific reference numerals 60a, 60b, 60c, 60d, 60e and 60f in FIG. 2. Each of the rotor openings 60 extend through the rotor 18 and intersects the forward and rearward faces 40 and 42 of the rotor 18. The rotor openings 60 are spaced circumferentially about a central portion of the rotor 18 and the rotor openings 60 are spaced at equal distance positions about a central portion of the rotor 18. The rotor openings 60 are spaced a distance 62 radially outwardly from a central portion of the rotor 18, the distance 62 being from the center of the rotor 18 to the center of the rotor openings 60.

In one embodiment as shown in FIG. 1, the heat generating unit 10 also includes a pump 64 which is connected to the inlet opening 24 in the housing 12 by way of a conduit 66 thereby establishing fluidic communication between the pump 64 and the inlet opening 24 by way of the conduit 66, the conduit 66 being more particularly being connected to the discharge end of the pump 64. The inlet end of the pump 64 is connected a coil assembly 68 by way of a conduit 70 and the outlet openings 26 in the housing 12 are connected to the coil assembly 68 by way of a conduit 72. The coil assembly 68 has opposite ends 74 and 76 and a coil opening 78 extending through a portion thereof generally between the opposite ends 74 and 76. The coil opening 78 is sized and shaped so that a water reservoir 80 is formed in a lower portion of the coil assembly 68, the water reservoir 80 being formed in a lower portion of a portion of the coil opening 78, as shown in FIG. 1. The conduit 70 more particularly is connected to the end 76 of the coil assembly 68 and positioned so that the conduit 70 is in fluidic communication with the water reservoir 80 portion formed in the coil opening 78. The conduit 72 more particularly is connected to each end 74 and 76 of the coil assembly 68 and the conduit 72 is positioned on the ends 74 and 76 so that the conduit 72 is in fluidic communication with a heated steam portion 82 formed in the coil opening 78 of the coil assembly 68, the heated steam portion 82 being that portion of the coil opening 78 which not being utilized to form the water reservoir 80 portion.

In operation, water is pumped from the water reservoir 80 by the pump 64 and the water is pumped into the inlet opening 24 in the housing 12, the water passing from the pump 64 into the inlet opening 24 by way of the conduit 66. The water passes through the inlet opening 24 and into the rotor cavity 14. Most of the water entering the rotor cavity 14 by way of the inlet opening 24 engages the forward face 40 of the rotor 18 and is moved in generally radially inwardly directions along the forward face 42 of the rotor 18 generally toward a central portion of the forward face 40 of the rotor 18. As the water is being moved in directions generally radially inwardly toward a central portion of the rotor 18 and along the forward face 40 of the rotor 18, most of the water passes between the upper ends 56 of the wedges 16 and the forward face 40 of the rotor 18. The passing of the water between the upper ends 56 of the wedge members 16 and the forward face of the rotor 18 shears the water resulting in friction thereby causing the water to be heated, the water entering the rotor cavity 14 at a first known temperature level and the water being heated to a second known temperature level higher than the first known temperature level as the water is moved radially inwardly along the forward face 40 of the rotor 18, the water heated to the second known temperature level being passed from the rotor cavity 14 through the outlet openings 26. In one preferred form, the water is heated to such a level that the water is converted into super heated steam, the super heated steam being passed from the rotor cavity 14 through the outlet openings 26. The heated water or super heated steam is passed from the housing 12 through the conduit 72 and into the coil assembly 68 thereby heating the coil assembly 68. As diagrammatically shown in FIG. 1, a fan 84 is connected to a fan motor 86 and the fan 84 is positioned to blow air in a direction generally over or across the coil assembly 68, the fan cooperating to move air over the coil assembly 68 where the air is heated or, in other words, the temperature level of the air is raised, the heated air passing from the coil assembly 68 being utilized to heat a building or for any other desired purpose.

Assumming that the water has been heated in the rotor cavity 14 so that super heated steam is passed from the rotor cavity 14, the super heated steam moves through the heated steam portion 82 of the coil opening 78 to heat the coil assembly 68 and condensed steam forms water which is passed into the water reservoir 80 portion of the coil opening 78 to be recycled back to the rotor cavity 14 by way of the pump 64.

It should be noted that some of the water passes between the rearward face 42 of the rotor 18 and the rearward end wall 30 formed in the housing 12, such water being heated by the heat generated within the rotor cavity 14 to the second temperature level. The heated water or super heated steam passes through the rotor openings 60 and is passed from the rotor cavity 14 through the outlet openings 26.

Each of the rotor openings 60 preferably is a circularly shaped hole having a five-sixteenths inch diameter and the centers of each of the rotor openings 60 is spaced the distance 62 of two inches from the center of the rotor 18. The diameter of the rotor opening 60 and the spacing of the rotor openings 60 from the center of the rotor are particularly important since it has been found that, if the rotor openings 60 are one-quarter inch diameter, the temperature level of the water passing through the rotor cavity 14 will not be raised to any significant degree. Further, it has been found that the wedges 16 should be positioned so that the distance 54 is equal to seven inches regardless of the diameter of the rotor 18 and it has been found that a ten inch diameter rotor 18 is the smallest rotor which can be utilized in the heat generating unit 10. The clearance between the outer peripheral surface 38 of the rotor 18 and the peripheral wall 32 formed in the housing 12 by the rotor cavity 14 preferably is one-eighth inch. In addition, it has been found that the distance 58 between the upper end 56 of each of the wedges and the forward face 40 of the rotor 18 should be a minimum of thirty thousandths for a ten inch diameter rotor with the distance 58 being a maximum of sixty thousandths of an inch with respect to a seventeen inch diameter rotor and a quarter inch maximum with respect to a thirty-six inch diameter rotor. In order to raise the temperature of the water passing through the rotor cavity 14 to any significant degree, it has been found that the heat generating unit 10 must include at least one wedge member 16 with four wedge members 16 being preferred and the heat generating unit must include a minimum of six rotor openings 60.

In one application, a rotor 18 having a diameter of about fourteen and three-quarter inches was utilized in the embodiment of the invention shown in FIG. 1 and, in this application, a fifteen horsepower pump 64 was utilized, the pump 64 being connected to a variable speed motor which was adjusted so that the pressure of the liquid feed mixture entering the inlet opening 24 was about 20 psig. In this application, the coil assembly 68 was heated to a coil surface temperature of about 250 degrees Fahrenheit in about twenty minutes. The liquid must be passed into the inlet opening 24 at a pressure level and, in general, the higher the pressure level, the higher the second predetermined temperature level.

EMBODIMENT OF FIG. 5

Shown in FIG. 5 is a heat generating unit 10a wherein the housing 12 and rotor 18 are constructed exactly like the housing 12 and rotor 18 shown in FIG. 1 and described in detail before. The heat generating unit 10a is constructed and operates exactly like that described before with respect to the heat generating unit 10 shown in FIG. 1, except the heat generating unit 10a is adapted to process liquid in a different manner and for a different reason.

As shown in FIG. 5, the heat generating unit 10a includes a pump 64a which is connected to the inlet opening 24 in the housing 12 by way of a conduit 100, the conduit 100 being connected to the discharge end of the pump 64a. The inlet end of the pump 64a is connected to a reservoir 102 by way of a conduit 104. The outlet opening or openings 26 in the housing 12 are connected to a conduit 106 and the discharge opening 27 in the housing 12 is connected to a conduit 108.

As shown in FIG. 5, the heat generating unit 10a, more particularly, is adapted to remove heavy metals from a liquid and, in one preferred application, the heat generating unit 10a shown in FIG. 5 is adapted to remove salt from water. In this application, salt water is contained in the reservoir 102 and the salt water is pumped by the pump 64a into the rotor cavity 14. The salt water is processed through the rotor cavity 14 while the rotor 18 is being rotating in a manner exactly like that described before so that the liquid or water is heated and is discharged from the rotor cavity 14 by way of the outlet openings 26 through the conduit 106. However, in this application, heavy metals such as salt are displaced to the lower end portion 36 of the rotor cavity 14 and this liquid mixture containing the heavy metals which were initially were in the feed liquid pumped into the rotor cavity 14 through the conduit 100 are passed from the rotor cavity 14 through the discharge opening 27 and the conduit 108. The liquid mixture containing the heavy metals discharged through the conduit 108 can be processed further downstream to recover the heavy metals if desired in some application. The heated liquid or steam discharged through the conduit 106 can be discharged to atmosphere or processed in a manner to generate heat in a manner described before with respect to FIG. 1.

Changes may be made in the various parts, elements and assemblies described herein or in the steps or sequence of steps of the methods described herein without departing from the spirit and the scope of the invention is defined in the following claims.

What is claimed is:

1. A heat generating unit for heating a liquid from a first temperature level to a second temperature level with the second temperature level being higher than the first temperature level, comprising:

a housing having a rotor cavity formed in a portion thereof, the rotor cavity forming in the housing, a forward end wall, a rearward end wall and a peripheral wall, an inlet opening being formed through a portion of the housing and intersecting a portion of the rotor cavity, an outlet opening being formed through a portion of the housing and intersecting the rotor cavity;

at least one wedge member, each wedge member being generally triangularly shaped in one cross section to form a wedge base, a forward wedge wall and an upper end spaced a distance generaly about the wedge base, each wedge member being disposed in the rotor cavity and the wedge base of each wedge member being connected to the forward end wall in the housing;

a generally circularly shaped rotor having an outer peripheral surface and rotatingly disposed in the rotor cavity, the rotor having a forward face, and a rearward face, the forward face of the rotor generally facing and being spaced a distance from the forward end wall in the housing and the rearward face of the rotor generally facing and being spaced a distance from the rearward end wall in the housing each wedge member being disposed generally between the forward face of the rotor and the forward end wall' in the housing and each wedge member being positioned on the forward end wall with the wedge forward wall generally facing a direction of rotation of the rotor, the outlet in the housing being diposed generally near a central portion of the rotor, a minimum of six rotor openings being formed through a central portion of the rotor with each rotor opening being spaced a predetermined distance from a center of the rotor and the rotor openings being spaced at equal distance positions circumferentially about the center of the rotor; and means for rotating the rotor in the direction of rotation generally toward the forward wedge wall of each wedge member, liquid being passable through the inlet opening in the housing and into the rotor cavity and moving through the rotor cavity generally toward the center of the rotor with at least some of the liquid passing between the upper ends of the wedge members and the forward face of the rotor and some of the liquid passing between the rearward face of the rotor and the rearward end wall in the housing and through the rotor openings end into the space generally between the forward face of the rotor and the forward end wall in the housing, the liquid passing from the rotor cavity through the outlet opening the housing, the liquid entering the rotor cavity through the inlet opening in the housing at the first temperature level and the liquid passing from the rotor cavity through the outlet opening in the housing at the second temperature level.

2. The heat generating unit of claim 1 defined further to include:

a pump for passing the liquid into the inlet opening in the housing at a predetermined pressure level;
a coil assembly;
means for passing the liquid at the second temperature level from the outlet opening in the housing and into the coil assembly for heating the coil assembly; and
means for passing air over the coil assembly, the coil assembly heating the air passing thereover.

3. The heat generating assembly of claim 1 wherein the means for rotating the rotor is defined further to include:

a shaft bearingly supported in the housing and having opposite ends, one end of the saft being connected to the center of the rotor; and
a motor connected to the end of the shaft, opposite the end of the shaft connected to the rotor, the motor being adapted to rotatingly drive the shaft and the rotor connected thereto.

4. The heat generating unit of claim 1 wherein the inlet opening in the housing is defined further as intersecting the forward end wall generally near the peripheral wall in the housing.

5. The heat generating unit of claim 1 wherein the distance between the upper end of the wedge members and the forward face of the rotor is defined further as being from about 30/100 inch and about ¼ inch.

6. The heat generating unit of claim 1 wherein the heat generating unit is further defined as being adapted to recover heavy metals in a feed liquid, and wherein the housing is defined further to include a discharged opening formed through a lower end portion of the housing intersecting the rotor cavity thereby establishing fluidic communication between the discharge opening and the rotor cavity, the heavy metals in the feed liquid passing to a lower end portion of the rotor cavity during the operation of the heat generating unit and the heavy metals being discharged from the heat generating unit by way of the discharge opening in the housing.

7. The heat generating unit of claim 1 defined further to include:

means for passing the liquid into the inlet opening in the housing at a predetermined pressure level.

8. The heat generating unit of claim 7 wherein the means for passing the liquid into the inlet opening in the housing is defined further as passing the liquid into the inlet opening at predeteremined pressure levels, in general the higher the pressure level of the liquid passing into the inlet opening in the housing the higher the second temperature level.

9. The heat generating unit of claim 1 wherein the wedge members are defined further to include at least four wedge members, the wedge members being spaced a predetermined distance radially from the center of the rotor and the wedge members being spaced at equal distant positions circumferentially about the center of the rotor.

10. The heat generating unit of claim 9 wherein the wedge members are defined further as being spaced the predetermined distance radially of about seven inches from the center of the rotor.

11. The heat generating unit of claim 1 wherein the rotor openings are defined further as being spaced the predetermined distance of about two inches from the center of the rotor.

12. The heat generating unit of claim 11 wherein each of the rotor openings is defined further as having a diameter of about 5/16ths of an inch.

13. A method for removing heavy metals from a feed liquid containing heavy metals utilizing a heat generating unit having a housing at least one wedge member and a generally circularly shaped rotor, the housing including a rotor cavity formed in a portion thereof, the rotor cavity forming in the housing a forward end wall, a rearward end wall and a peripheral wall, an inlet opening being formed through a portion of the housing and intersecting a portion of the rotor cavity an outlet opening being formed through a portion of the housing intersecting the rotor cavity, and a discharge opening being formed through a lower end portion of the housing intersecting the rotor cavity, each wedge member being generally triangularly shaped in one cross section to form a wedge base, a forward wedge wall and an upper end spaced a distance generally above the wedge base, each wedge member being disposed in the rotor cavity and the wedge base of each wedge member being connected to the forward end wall in the housing, the rotor being generally circularly shaped and being rotatingly disposed in the rotor cavity, the rotor having a forward face, a rearward face and an outer peripheral surface, the forward face of the rotor generally facing and being spaced a distance from the forward end wall in the housing and the rearward face of the rotor generally facing and being spaced a distance from the rearward end wall in the housing, each wedge member being disposed generally between the forward face of the rotor and the forward end wall in the housing and each wedge member being positioned on the forward end wall with the wedge forward wall generally facing the direction of rotation of the rotor, the outlet in the housing being disposed generally near a central portion of the rotor, a minimum of six rotor openings being formed through a central portion of the rotor with each rotor opening being spaced to predetermined distance from a center of the rotor and the rotor openings being spaced at equal distance positioned circumferentially about the center of the rotor, the method comprising:

rotating the rotor in a direction of rotation;
passing the feed liquid containing heavy metals into the inlet in the housing and into the rotor cavity and moving through the rotor cavity generally toward the center of the rotor with at least some of the liquid passing between the upper ends of the wedge members and the forward face of the rotor and some of the liquid passing between the rearward face of the rotor and the rearward end wall of the housing and through the rotor openings into the space generally between the forward face of the rotor and the forward end wall of the housing, a substantial portion of the liquid passing from the rotor cavity through the outlet opening in the housing and some of the liquid and a significant portion of the metals contained in the liquid feed mixture being passed to a lower end portion of the rotor cavity; and discharging from the lower end portion of the rotor cavity the liquid containing heavy metals through the discharge opening in the housing.

14. A method for removing salt from a feed liquid containing salt utilizing a heat generating unit having a housing at least one wedge member and a generally circularly shaped rotor, the housing including a rotor cavity formed in a portion thereof, the rotor cavity forming in the housing a forward end wall, a rearward end wall and a peripheral wall, an inlet opening being formed through a portion of the housing and intersecting a portion of the rotor cavity an outlet opening being formed through a portion of the housing intersecting the rotor cavity, and a discharge opening being formed through a lower end portion of the housing intersecting the rotor cavity, each wedge member being generally triangularly shaped in one cross section to form a wedge base, a forward wedge wall and an upper end spaced a distance generally above the wedge base, each wedge member being disposed in the rotor cavity and the wedge base of each wedge member being connected to the forward end wall in the housing, the rotor being generally circularly shaped and being rotatingly disposed in the rotor cavity, the rotor having a forward face, a rearward face and an outer peripheral surface, the forward face of the rotor generally facing and being spaced a distance from the forward end wall in the housing and the rearward face of the rotor generally facing and being spaced a distance from the rearward end wall in the housing, each wedge member being disposed generally between the forward face of the rotor and the forward end wall in the housing and each wedge member being positioned on the forward end wall with the wedge forward wall generally facing the direction of rotation of the rotor, the outlet in the housing being disposed generally near a central portion of the rotor, a minimum of six rotor openings being formed through a central portion of the rotor with each rotor opening being spaced to predetermined distance from a center of the rotor and the rotor openings being spaced at equal distance positioned circumferentially about the center of the rotor, the method comprising:

rotating the rotor in a direction of rotation;

passing the feed liquid containing salt into the inlet in the housing and into the rotor cavity and moving through the rotor cavity generally toward the center of the rotor with at least some of the liquid passing between the upper ends of the wedge members and the forward face of the rotor and some of the liquid passing between the rearward face of the rotor and the rearward end wall of the housing and through the rotor openings into the space generally between the forward face of the rotor and the forward end wall of the housing, a substantial portion of the liquid passing from the rotor cavity through the outlet opening in the housing and some of the liquid and a significant portion of the salt contained in the liquid feed mixture being passed to a lower end portion of the rotor cavity; and discharging from the lower end portion of the rotor cavity the liquid containing salt through the discharge opening in the housing.

* * * * *